Aug. 7, 1934.                W. W. HARTMAN                1,969,004
SLICING, DIVIDING, AND WRAPPING APPARATUS
Filed Nov. 9, 1931          5 Sheets-Sheet 1
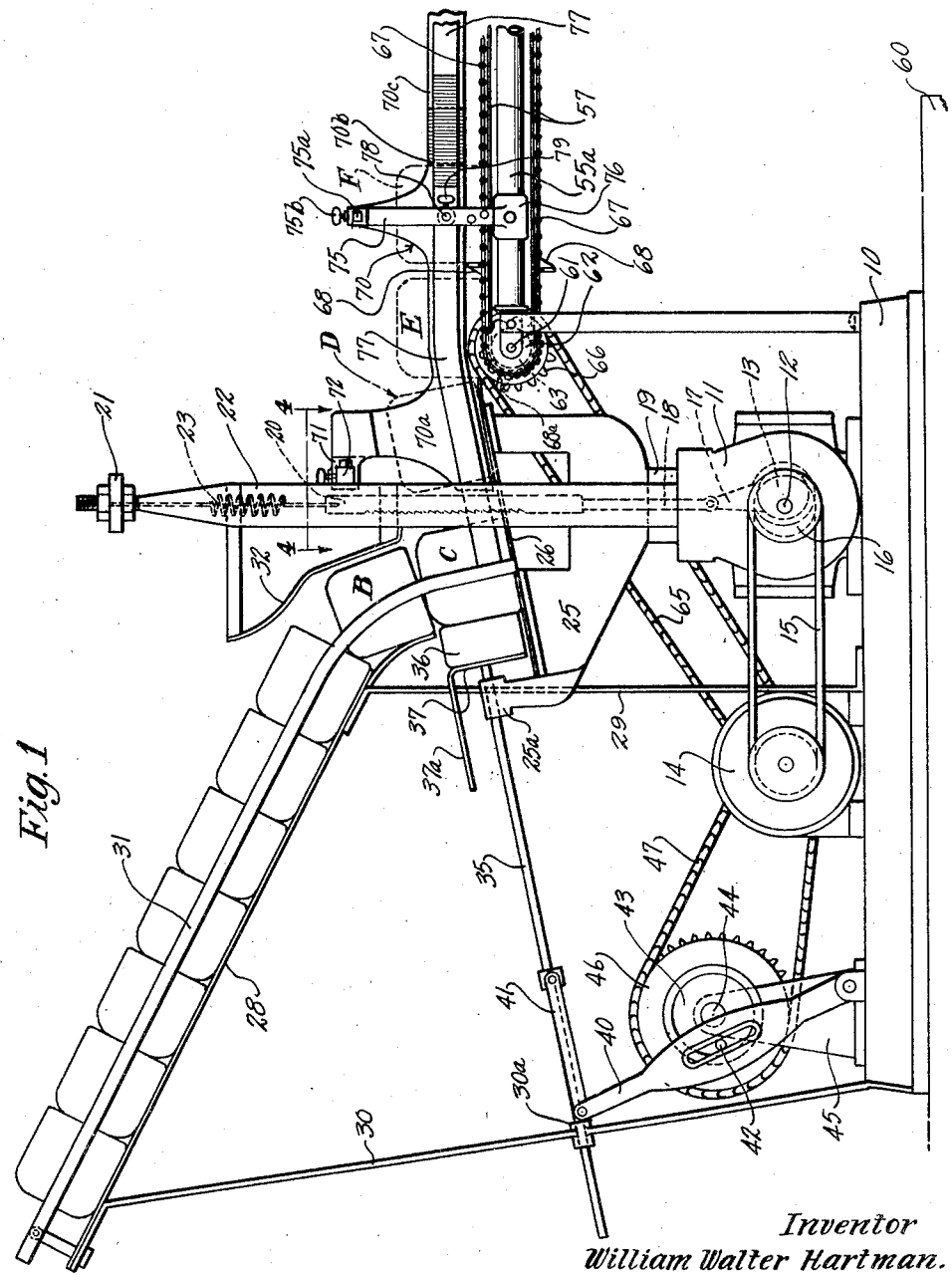
Fig.1
Inventor
William Walter Hartman.
Attorney.

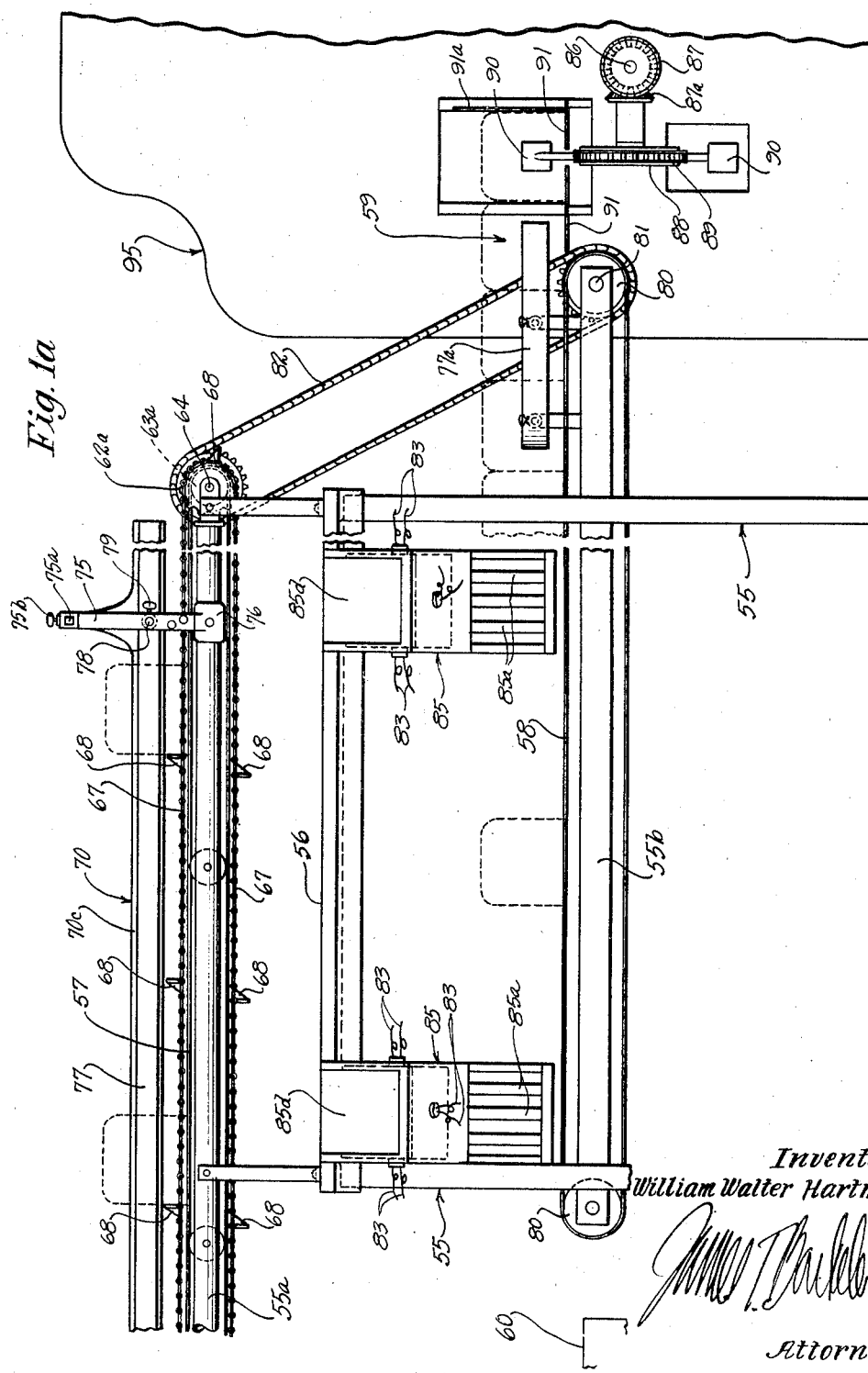

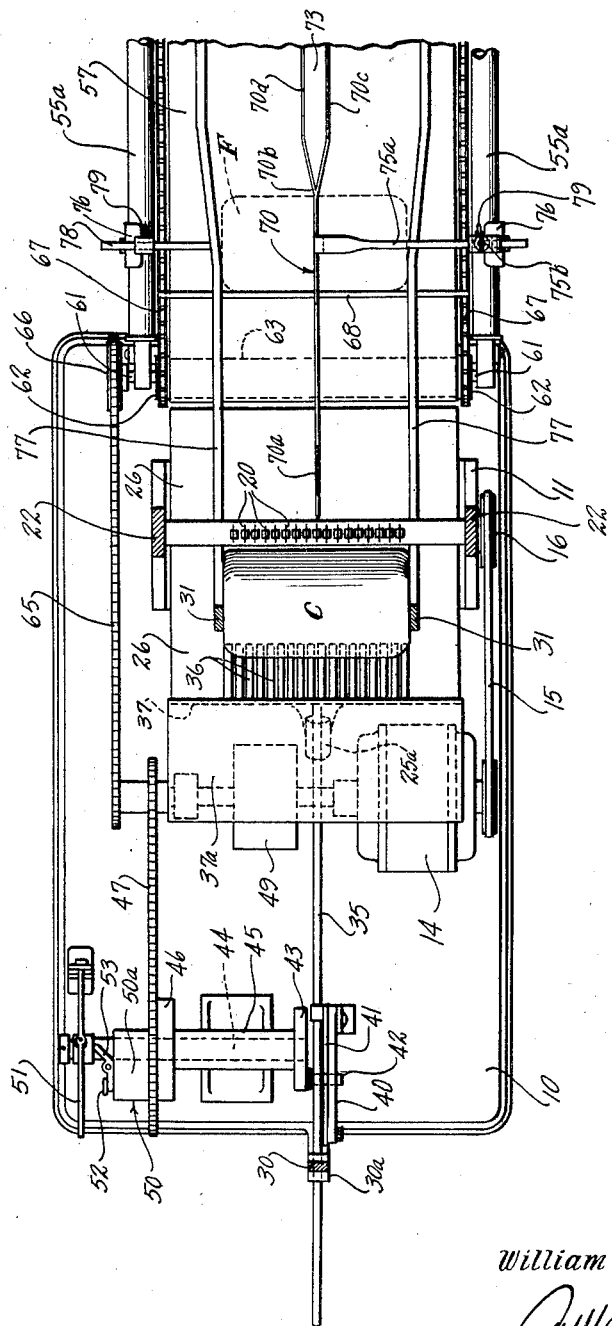

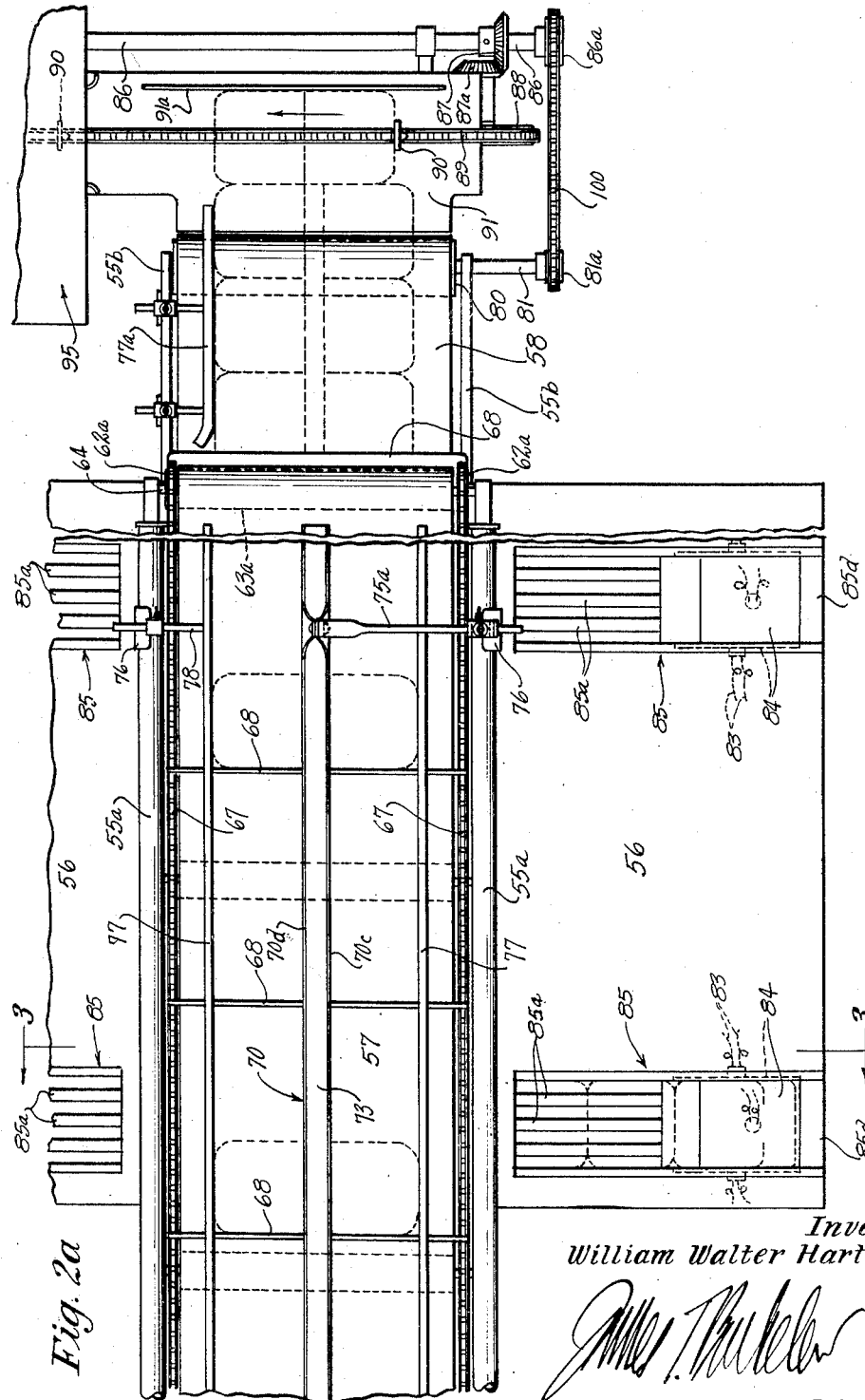

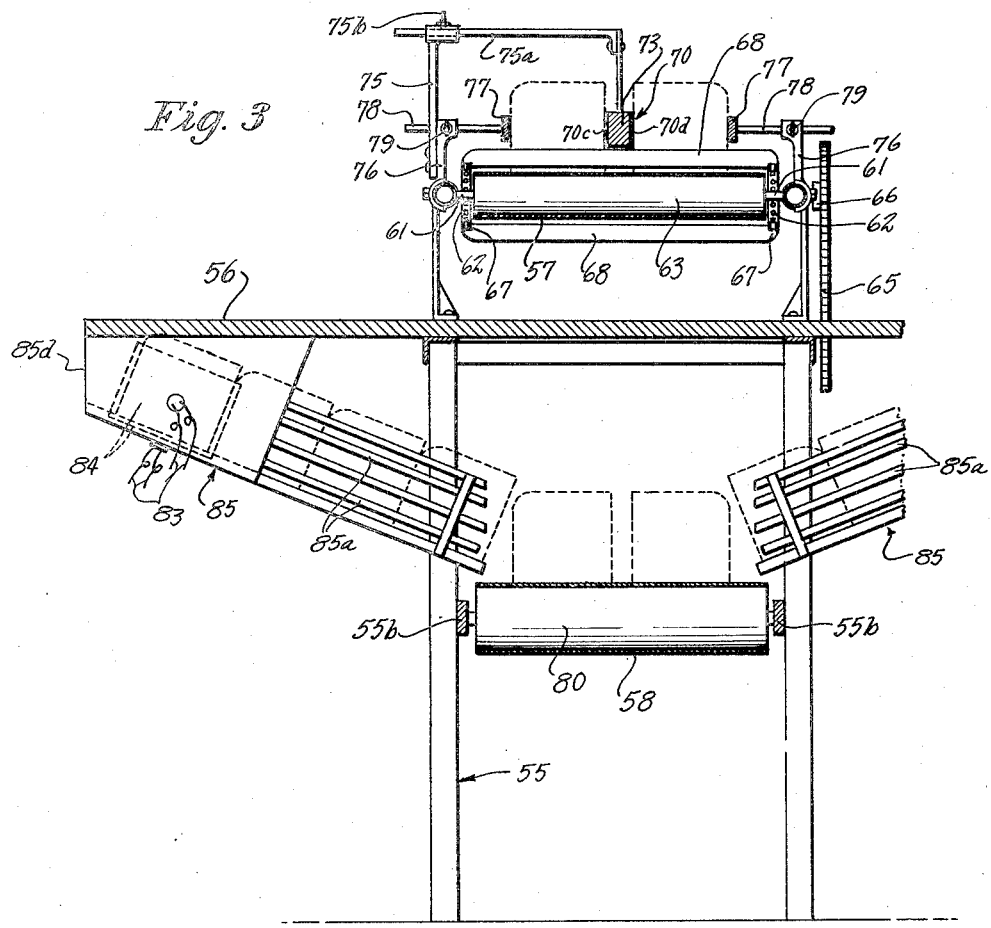
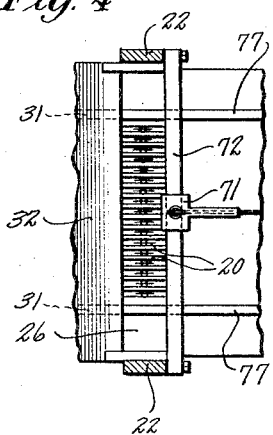

Patented Aug. 7, 1934

1,969,004

UNITED STATES PATENT OFFICE

1,969,004

SLICING, DIVIDING, AND WRAPPING APPARATUS

William Walter Hartman, Los Angeles, Calif.

Application November 9, 1931, Serial No. 573,891

29 Claims. (Cl. 93—2)

This invention relates to bread handling devices and more especially to devices used in the production of what may be termed "double" or "multiple" wrapped bread, i. e., loaves that are separately wrapped in halves or thirds or any other suitable division of the whole loaf, and the loaf divisions are then further wrapped together as a whole loaf. The invention is not necessarily restricted to operation on bread, being applicable to any article where the operations here described are desirable; but a description with relation to bread loaves will make the invention more intelligible.

The introduction of sliced bread has been attended with certain inherent difficulties, among which has been that of maintaining the slices in fresh, moist condition until finally consumed. The conventional waxed paper wrapping inclosing the entire sliced loaf is adequate to protect and preserve the bread until delivered to the consumer. When the wrapping is broken to permit the removal of its contents, the entire loaf is exposed to the air. Because of the large area of the cut surfaces, the loaf dries out rapidly and loses its freshness and flavor unless consumed within a relatively short time of the opening of the package.

To overcome this disadvantage, the loaf is first wrapped in smaller units, of which a half loaf is a convenient size, the halves, wrapped separately, then being again wrapped in the conventional manner to form a single, "double wrapped" loaf. The breaking of the external wrapping does not now remove the protection of the sliced bread, each half loaf keeping fresh until individually opened and being of such a size that, at what may be called the ordinary family rate of consumption, the bread does not lose its freshness before the last of the half loaf is eaten. The second half loaf is preserved by this method of wrapping in its original state of freshness, and does not become stale while awaiting consumption.

It becomes, therefore, a general object of my invention to provide means for separating the loaf into halves, thirds, or other suitable loaf divisions, wrapping the loaf divisions separately, and then rejoining the divisions for a second wrapping into complete loaf form; together with slicing means, wrapping means, and suitable conveying means.

To accomplish this, I provide various parts and mechanisms, including slicing means, conveyor means, and a parting device to divide the sliced loaf into suitable loaf divisions, together with means to wrap the loaf divisions separately and, finally, together.

Rather than to enlarge upon this preliminary description, I shall now proceed to describe in detail, as an illustration, a present preferred embodiment of my invention and for purposes of simplification I will confine myself to the assumption that the loaf is divided only into two halves, but it will be understood that the loaf can be divided into any other suitable number of loaf divisions all within the scope of my invention. Reference is had for this purpose to the following description, and to the drawings, in which:

Figs. 1 and 1a are side elevations, showing, (along with other parts and features) the sliding mechanism, the conventional wrapping devices, and the conveying and transferring mechanism, all combined and associated in accordance with my invention, the entire figure being in two parts to permit the use of a suitable scale;

Figs. 2 and 2a are plan views of Figs. 1 and 1a, respectively;

Fig. 3 is a vertical section of the wrapping table and conveying belt on line 3—3 of Fig. 2a;

Fig. 4 is a fragmentary plan view on line 4—4 of Fig. 1 showing the adjustable end support of the divider.

The slicing mechanism illustrated in Figs. 1 and 2 is described in detail in my copending applications Ser. No. 429,050, filed February 17, 1930, and Ser. No. 544,429, filed June 15, 1931, and consequently I shall give only a brief description of the slicer in the present case. The form shown is one of my preferred forms of slicers and is typical of such slicing mechanisms as are suitable in connection with the present invention for it will be realized that other types of slicers may be used.

Mounted on base 10 is a crank case 11 within which is journalled eccentric-shaft 12. The eccentric-shaft is driven from motor 14 by belt 15 which passes over pulley 16 fastened on an end of the eccentric-shaft projecting out of the crank case. Eccentric-shaft 12 has a plurality of eccentrics 13 to which are attached, by means of eccentric straps 17 and push rods 18, which latter have a bearing in guide block 19 mounted on top of crank case 11, a series of horizontally spaced, vertically reciprocating slicing knives 20 disposed in the path of the loaves of bread. Knives 20 are spring supported at their upper ends from cross bar 21 mounted at the top of side uprights 22. Springs 23 keep the knives under a continual tension and insure a smooth cut of the loaf.

Resting on top of guide block 19 is bracket 25 which supports plate 26 upon which the loaves rest as they are moved past cutters 20. Unsliced loaves are fed onto plate 26 by being placed upon gravity chute 28, supported by uprights 29, 30, the chute being so shaped as to drop the loaves into position C ahead of cutters 20. Longitudinal side rails 31 are provided to position the loaves laterally in the chute and guard 32 is provided to prevent the loaves from falling into the upper part of the knives.

The actuating means for feeding loaves through the slicing knives includes a reciprocating ram slidably mounted in bearings 25a and 30a in bracket 25 and support 30 respectively, said bearings being so positioned that ram 35 moves in a direction substantially parallel to plate 26. On the forward end of ram 35 is pusher 36 adapted to press against the rear side of the loaf to push it through cutters 20. Pusher 36 is made up of a plurality of horizontally spaced plates, the several plates being adapted to move between the spaced knives 20. This is indicated in Fig. 2. The plates of pusher 36 are mounted at their rearward edges on head plate 37, the upper portion of which is bent backwardly parallel to ram 15 to form cut-off 37a. When ram 35 advances, cut-off 37a moves under the loaf at B to hold it up until time for it to drop onto plate 26 at C.

Ram 35 is reciprocated by means of oscillating arm 40 to which it is attached by link 41. Arm 40 is pivoted at its lower end to base 10 and is slotted to receive crank pin 42 on disk 43 mounted on one end of shaft 44 journalled in pedestal bearing 45. Shaft 44 is driven by sprocket 46 and chain 47 from the power take-off shaft of speed reducer 49 which in turn is driven by motor 14. Sprocket 46 is loosely mounted on shaft 44 and a clutch 50, operated by handle 51, is adapted to lock sprocket 46 to the shaft when a driving connection is desired. The clutch has a driving portion 50a keyed to shaft 44 and in this position 50a is a pin 52 which when in the position of Fig. 2 locks sprocket 46 to the clutch driving element. Release is effected by moving handle 51 toward the clutch thus causing rock-lever 53 to withdraw pin 52 and disconnect sprocket 46 from the clutch.

It will be understood that the ram, acting to push successive loaves through the knives, also acts to push previously sliced loaves away from the knives, through such positions as are indicated at D and E.

From the slicer, the bread, by any suitable means, is next moved past the divider, where the sliced loaf is automatically separated into any desired number of loaf divisions, and then these loaf divisions are automatically moved to the means where the divisions are separately wrapped and sealed. In the embodiment of my invention as shown herein, this means where the loaf divisions are separately wrapped, includes among other parts and features, a wrapping bench or table hereinafter more specifically referred to, and in this form of my invention the individual wrapping of the loaf divisions is performed manually at such wrapping table. However, I also contemplate doing this operation automatically, and am at present developing the details of this feature, but whether this particular step is done automatically or manually does not affect the broad sequence of parts that I have combined for accomplishing the "multiple" wrapping of bread, as set forth in claims appended hereto.

Although the detailed construction and co-action of the parts can be extensively varied, I have illustrated in the drawings one form of parts by which the bread, after leaving the slicer, immediately encounters the loaf divider consisting, in the form shown, of the divider blade 70a, Figs. 1 and 2. I have shown only one such divider, because this is all that is necessary to divide the sliced loaf into two halves, but if a greater number of loaf divisions were desired, it is obvious that this could be readily accomplished by providing more divider blades 70a, and properly locating them with reference to the slicer blades 20.

The provisions for separately wrapping the half loaves, as illustrated in Figs. 1a, 2a, and 3, comprise generally a frame 55, a working surface or table portions 56, an upper conveyer belt 57, and a lower conveyer belt 58. The slicer is preferably on a platform 60 raised above the floor level of the wrapping table so that the slicer can discharge sliced loaves directly onto the upper belt.

Between the ends of a pair of longitudinal frame members 55a is carried shaft 61 (Fig. 1) to which are secured a pair of sprockets 62 and roller 63. Shaft 64 at the other end of members 55a carries a similar pair of sprockets 62a and roller 63a (see Fig. 2a). Belt 57 passes around rollers 63, 63a and is driven by roller 63, power for this purpose being transmitted from speed reducer 49 by chain 65 to sprocket 66 on shaft 61. This also serves to drive a pair of chains 67 on sprockets 62, 62a, the chains extending one on each side of and parallel to belt 57 and having cross-cleats 68 mounted on and extending between them. The pitch diameter of sprockets 62 and 62a is preferably greater than the outside diameter of rollers 63 and 63a, and as a result the chains move at a slightly greater lineal speed than the belt so that though the belt is traveling and carrying the loaf, the faster moving cleats push the loaves along the belt.

The advantage of the differential between the speed of cleats 68 and belt 57 may be readily appreciated from a consideration of the conditions attending the placing of the sliced bread upon belt 57. Referring to Fig. 1, it will be seen that the sliced loaf is first advanced by ram 35 to a position D on the delivery end of plate 26. The succeeding stroke of the ram moves loaf C through the cutters and necessarily displaces the loaf at D, pushing it onto the belt to position E. It may be desirable to fully displace loaf D onto the belt so that it rests entirely upon belt 57 since there must be a gap between the belt and plate 26 in order to permit the passage of cleats 68 therebetween. In any case, when about one-half the loaf has been placed upon belt 57, the belt begins to move the loaf forward, but as the pull may not be evenly applied to all the slices, the slices may be moved forwardly somewhat out of alinement. This is remedied when a cleat 68 catches up with the loaf and as the cleat begins to move the loaf along belt 57 it alines all of the slices and keeps them so during the passage of the loaf along the upper belt.

Inasmuch as ram 35 and belt 57 are both driven from speed reducer 49, they are driven in timed relation with each other, and the placing of the loaf on the belt 57 is so timed that this action occurs just as a cleat is rounding sprocket 62, in approximately the position of cleat 68a in Fig. 1, the cleat catching up with the loaf just after it has been placed on the belt. Accurate timing of the cleat movement with regard to the ram is not required. The positions E and 68a indicate the approximate relative positions of the loaf and cleat respectively when the ram is at or near the forward end of its stroke; and by the time the ram is retracted the loaf has moved to the vicinity of position F. In other words it is preferable that the cleat should first engage the sliced loaf at a time when the sliced loaves are not being advanced by the ram. Thereafter the belt supports the sliced loaf, but the cleat positively drives it slightly faster than the belt.

As the sliced loaf is moved away from the slicing knives the loaf is divided into two halves and the two halves separated a suitable distance. A preferred means for accomplishing this is the divider generally indicated at 70. Divider 70 has a thin flat blade or sheet portion 70a supported at its forward end by a collar 71 slidably mounted upon rectangular bar 72 fastened to uprights 22 (see Figs. 1 and 4). The blade is thus adjustable cross-wise of the sliced loaf so that it may be moved to divide the loaf at any desired point, and to register accurately with any slice cut. Blade 70a is preferably of about the same thickness as knives 20 and is advanced to a position very near the rear edges of the knives so that the divider will freely insert between two slices while the kerf is still held open by the knife.

Blade 70a continues for a distance as a single thin member separating the loaf into two portions as the loaf moves onto and along the conveyor; and it will be realized that it may be necessary to extend this portion of the divider for some distance until the loaf reaches a position at which the two halves can be further separated, preferably, at least, until the loaf has been picked up and is being driven by a cross cleat 68. At such a point, the divider widens and then preferably comprises two separate sheets 70c and 70d joined, acutely angularly, at 70b to sheet 70a, a spreader block 73 being employed to properly space sheets 70c and 70d. As the loaf is moved along the conveyor belt, the divergence of the sides of this latter portion of the divider expands the loaf by increasing the separation distance between the two halves of the loaf as indicated; and although I here show the interval between loaf halves as being only an amount sufficient to permit insertion of the fingers between the two halves so that the halves may be easily picked up from the conveyor belt, yet it will be understood that the amount of the separation may be much greater if desired, and may be made to suit any requirements. Brackets 75 (Fig. 3), attached to brackets 76 on side members 55a, receive slidably the horizontal rods 75a carrying at one end the block 73 so that the divider 70 may be adjusted as a unit crosswise of conveyor belt 57. Thumbscrews 75b clamp the rods 75a in position.

For the purpose of keeping the slices in unitary relation, side rails or guides 77 are provided to bear against the ends of the loaves. Guides 77 are a preferred form of slice confining means, but are to be considered only as typical as any suitable means may be used. Rails 77 are mounted upon horizontally extending rods 78 (Fig. 3) slidably mounted in brackets 76 so that the rails may be moved toward and away from each other and clamped in the desired spacing by means of thumb screws 79. The side rails parallel divider 70 and as the divider diverges at 70b the side rails also diverge an equal amount so that the distances between the side rails and the divider surfaces are equal to one-half a loaf length. The side rails and divider engage the loaves on or near their central plane, above the path of the pusher cleats 68 which operate close to the belt.

Rails 77 act as guides to direct the loaf movement and cooperate with the divider to hold the sliced sections together as units. Considered together, the divider, rails 77, and belt 57 form two open-topped passageways or channels which receive and confine the sliced sections. At a point removed from the knives, the channels diverge, their walls remaining substantially parallel, in order to develop the gap which separates the loaf sections.

As the sliced bread moves along belt 57, the half loaves are, in this case, manually wrapped by operators standing on either side of the working tables or surfaces 56 on which this operation is performed. The conventional wrapping material used is waxed paper and the wrapping is sealed by inserting the half loaf in the sealing slide 85 which has attached to its sides a set of hot plates 84 that melt the wax which seals the paper upon congealing. Details of the hot plates need not be here illustrated, as these are conventional, and preferably consist of electrical heating units to which electrical energy is supplied through leads 83. As may be seen from Fig. 3, the lower portion of sealing slide 85 is formed of a plurality of bars 85a so that the melted wax may cool and set to seal the wrapping before the loaf is placed on belt 58.

The pitch or slope of the sealing slides may be relatively slight as shown, so that the wrapped loaf divisions do not slide down under the action of gravity, but instead accumulate end for end on the slide, the farthest one being ejected onto belt 58 each time that a new loaf division is pushed into the entry end 85d of the sealing slide by the operator. In this way the loaf divisions can be made to go through the slides 85 at the correct average speed to cool and seal the wrapping, and of course for this purpose the length of the hot plates 84, and of the cooling slats 85a are correctly proportioned. Also, the slats are preferably equal in length to an integral number of half loaves so that when a freshly wrapped half is inserted between the hot plates and a previously inserted half loaf displaced by advancing the forward end of the second half even with the lower end of the plates, the farthest half loaf in the slide is fully and cleanly ejected onto the conveyor belt and does not catch on the ends of the slide.

Although I have not fully illustrated both sides of the wrapping table 56 it will be understood that the wrapping table is symmetrical about a vertical center line so that the operators can work preferably in pairs, one on each side of the table. In this way the two halves of the same loaf will be handled and wrapped by oppositely facing workers. Furthermore, though I show only one complete working space, and indicate the beginning of a second one at the side of the first, it will be understood that as many working spaces, or pairs of working spaces, may be provided along each side of the conveyor, as are required for the operators to handle the bread at the rate at which it is sliced.

The lower conveyor belt 58 is carried on a pair of rollers 80, (see Fig. 2a) one of which is attached to shaft 81 journaled in the ends of a frame member 55b. The belt may be driven in various ways, as for instance by means of chain 82 from shaft 64 of the upper belt, see Fig. 1a, or else it may be driven in the manner indicated in Fig. 2a, to which more detailed reference will be made later. This belt serves as a means to convey the loaves from the wrapping table to the final wrapping machine, which will be described; and also serves as an automatic feed means to place the half loaves on the wrapper infeed in a manner described later.

The final wrapping machine for wrapping complete loaves of bread, is illustrated diagrammatically at 95, only the wrapper infeed being shown in any detail, because such wrapping machines are well known in the art and because my invention may be adapted to any wrapper having a suitable infeed. The infeed here shown is similar to that commonly employed. In such wrapping machines the infeed conveyor is generally timed to operate in synchronism with the other parts of the wrapper 95, so that the loaves are fed into the wrapper at the proper intervals, the infeed being adapted to operate either intermittently or continuously. For illustration, shaft 86, driven from the wrapper main power source, drives the meshing bevel gears 87 and 87a which in turn rotate drive sprocket 88 around which feed chain 89 passes. Chain 89 has a plurality of pushers 90 spaced along the chain adapted to push loaves of bread along the stationary conveyor plate 91 into the wrapper to a position at which they are picked up by the wrapping mechanism and wrapped as complete loaves.

I will now describe the action by which the separately wrapped half loaves are automatically transferred by belt 58 onto the final wrapper infeed, to be there fed by pusher members 90 into the wrapper 95, where the separately wrapped half loaves are finally wrapped together to form a merchantable full-loaf package.

Since the half loaves are more or less irregularly delivered onto belt 58 from the sealing slides 85, it follows that toward the left hand end of belt 58, as viewed in Fig. 1a, the half loaves will not be positioned at equal intervals on the belt, nor will the two opposite half loaves that are destined to re-unite to form a complete loaf, be located in exact line opposite each other, but instead the half loaves will be arranged somewhat irregularly on that portion of the belt where they are received from the oppositely disposed sealing slides 85.

This irregular distribution of the half loaves however can be automatically corrected in the vicinity of the right hand end of belt 58, and the half loaves correctly delivered, two at a time, into the infeed conveyor of the wrapper, by the following procedure.

When the entire mechanism is first started, one of the operators holds his hand at the point generally designated by reference numeral 59, Fig. 1a, and as the separately wrapped half loaves commence to come along belt 58, he can stop them at position 59, until a fair number of half loaves, say approximately six on each side of the belt, (being equivalent to six full loaves), are stacked against each other at the right hand extremity of belt 58, this belt slipping beneath these accumulated half loaves until the operator presently removes his hand. In this way the mechanism may be said to be primed with half loaves at this point. With everything now going at the usual rate, if the operator will remove his hand, the half loaves will commence to pass, two at a time, in normal manner into the infeed conveyor, the first two half loaves moving across the stationary plate 91 until they are arrested by the back stop 91a, where they will rest until the pusher 90 pushes them as a unit endwise in the direction of the arrow into the final wrapper 95, where the half loaves are wrapped as a full loaf.

It will be understood that it is the friction of belt 58 against the bottom of the accumulated half loaves at the right hand end of this conveyor, that pushes the successive half loaves across the stationary infeed plate 91 against the backstop 91a, and also that as the loaves are taken away in this endwise manner by the successive infeed pushers 90, the loaves nevertheless continue to accumulate in closely stacked relation at the right hand end of this conveyor. It will be seen that the two halves are brought together in juxtaposition by the movement of pusher 90 if this has not already been done on belt 58. As each pusher 90 pushes its two half loaves into the wrapper 95, the next two half loaves from the conveyor or transfer member 58 are moved by the pressure of succeeding loaves across the stationary plate 91 against the backstop 91a, and there await the next oncoming pusher 90, which feeds these two half loaves into the wrapper as the previous pusher did; and in this manner the operations proceed in regular and smooth fashion, the half loaves accumulating in stacked relation at the right hand end of the relatively rapidly moving belt 58, and the pushers 90 always taking away the two most advanced half loaves, and feeding them into wrapper 95 where they are wrapped into full loaf packages as described. The endwise movement of the half loaves that are being propelled by pushers 90, does not disturb the nice stacked relation of the next half loaves that are awaiting transfer against backstop 91a, as any frictional tendency to prematurely move the latter endwise is arrested and prevented by the guide rail 77a, which in any suitable manner is mounted on frame member 55b in the position shown in Fig. 2a, slightly above belt 58, and near the right hand end of the latter. In this manner the even feeding of the half loaves onto the infeed of the wrapper is accomplished, and the half loaves are wrapped in wrapper 95 to form merchantable full-loaf packages, with the advantages previously described for the "double" wrapping of the bread.

When the belt or transfer member 58 is directly driven in timed relation from and with the mechanism of wrapper 95, as may be desirable under some circumstances, this can be conveniently accomplished as illustrated in Fig. 2a, where the infeed drive shaft 86, of wrapper 95, is shown to carry a large sprocket 86a, which through drive chain 100 and sprocket 81a, drives shaft 81, which in turn drives belt 58 in manner previously described. When the belt 58 is driven from the wrapper as indicated in Fig. 2a, chain 82 driving the belt from shaft 64 is omitted.

Having described a present preferred embodiment of my invention, it will be understood that the drawings and description are to be considered merely illustrative of and not restrictive upon the broader claims appended hereto; and extensive changes in design, structure, and arrangement may be made without departing from the spirit and scope of my invention. Thus, I do not wish to be limited to the particular arrangement set forth for wrapping and handling the half loaves for it will be appreciated that other means may be used and it is contemplated that such means are included within the scope of the broader of the following claims.

I claim:

1. In combination, a slicing mechanism including a plurality of slicing knives operating substantially in a cutting plane, and a loaf dividing plate extending in a direction transversely to the cutting plane, having a thin forward edge near the cutting plane, and adjustable substantially parallel to the cutting plane to be placed in position opposite any of the slice cuts.

2. In combination, a slicing mechanism adapted to slice a loaf or the like into a plurality of slices, means for moving a loaf longitudinally through the slicing mechanism and for moving it on away longitudinally from the slicing mechanism, said means including a delivery conveyor, and a loaf divider having a thin forward edge adapted to enter a slice cut and extending longitudinally over and parallel to the delivery conveyor; and means for wrapping the loaf divisions separately.

3. In combination, a slicing mechanism adapted to slice a loaf or the like into a plurality of slices, means for moving a loaf longitudinally through the slicing mechanism and for moving it on away longitudinally from the slicing mechanism, said means including a delivery conveyor, and a loaf divider having a thin forward edge adapted to enter a slice cut and extending longitudinally over and parallel to the delivery conveyor; and means for wrapping the loaf divisions first separately and then together.

4. In combination, a slicing mechanism adapted to slice a loaf or the like into a plurality of slices, means for moving a loaf through and away from the slicing mechanism, said means including a delivery conveyor, and a loaf divider having a thin forward edge adapted to enter a slice cut and extending longitudinally over and parallel to the delivery conveyor; wrapping means for the loaf divisions separately, and a wrapping mechanism taking the separately wrapped loaf divisions and wrapping them together as a single loaf.

5. In combination, a slicing mechanism adapted to slice a loaf or the like into a plurality of slices, a loaf divider operating to divide the sliced loaf at a slice cut, means for wrapping each loaf division separately, and means for wrapping the separately wrapped loaf divisions together as a single loaf.

6. In combination, a slicer operating to receive and slice a loaf of bread, dividing means to divide the sliced loaf into two portions and then separate the portions to be wrapped separately, assembling means to subsequently assemble the separated portions in adjoining relationship, wrapping means to receive and wrap as a unit the assembled portions, and conveying means to feed loaves or portions thereof from the slicer past the dividing means and to said assembling means and wrapper.

7. In combination, a slicer operating to receive and slice loaves of bread, dividing means to divide the sliced loaf into two portions, means to wrap said portions individually and separately, assembling means to assemble the two wrapped portions in adjoining relationship, wrapping means adapted to receive and wrap as a unit the two adjoining portions, and suitable conveying means to carry the sliced loaf and its subdivisions from the position of one operation to the position of the succeeding operation.

8. In combination a slicing mechanism comprising a plurality of slicing knives operating substantially in a single cutting plane, means to move loaves or the like longitudinally through the slicing knives and longitudinally away from the slicing mechanism, said means including a longitudinally moving delivery conveyor belt, a loaf divider having a thin entering edge located near the slicing plane and extending longitudinally away from that plane over and parallel to the delivery conveyor belt, and said divider having, at a point intermediate in its length, an expansion in thickness operating to expand the loaf divisions as the sliced loaf is moved along the divider, and slice confining side rails located over the delivery conveyor belt and paralleling the divider to confine the divided loaf slices transversely aaginst the divider.

9. In combination, mechanism for slicing a loaf of bread into a plurality of slices, dividing means for automatically separating the sliced loaf into a plurality of loaf divisions, means for wrapping each loaf division separately, an infeed conveyor of an automatic wrapping machine that automatically wraps complete loaves of bread, and transfer means adapted to receive said separately wrapped loaf divisions and adapted to transfer to said infeed conveyor of the automatic wrapping machine a sufficient number of said separately wrapped loaf divisions in proper assembled relation to comprise a complete loaf of bread deposited on said infeed conveyor.

10. In combination, mechanism for slicing a loaf of bread into a plurality of slices, dividing means for automatically separating the sliced loaf into a plurality of loaf divisions, means where each loaf division is separately wrapped in waxed paper or the like, heating elements for sealing the wrapper of each loaf division, an infeed conveyor comprising part of an automatic wrapping machine that automatically wraps complete loaves of bread, and transfer means adapted to receive said separately wrapped loaf divisions, and adapted to transfer to said infeed conveyor of the automatic wrapping machine a sufficient number of said separately wrapped loaf divisions in proper assembled relation to comprise a complete loaf of bread deposited on said infeed conveyor.

11. In combination, loaf slicing means, loaf dividing means for dividing the sliced loaf into a plurality of loaf divisions, wrapping means where said loaf divisions are separately wrapped, and conveying means for feeding the loaves first through said slicing means, then past said dividing means, and then past said wrapping means.

12. In combination, loaf slicing means, loaf dividing means for dividing the sliced loaf into a plurality of loaf divisions, a wrapping platform where said loaf divisions are separately wrapped, and conveying means for feeding the loaves first through said slicing means, then past said dividing means, and then past said wrapping platform.

13. In combination, loaf slicing means, loaf dividing means, loaf wrapping means, wrapper sealing means associated with said wrapper means, and conveying means for feeding the loaves first through said slicing means, then past said dividing means, and then past said wrapping means.

14. In combination, loaf slicing means, loaf dividing means for dividing the sliced loaf into a plurality of divisions, a reciprocating ram for feeding loaves through said slicing means, a continuously moving belt upon which the sliced loaves are placed by the ram, moving cleats cooperating to slide said sliced loaves along the belt away from said slicing means, and means for moving said cleats in timed relation to said reciprocating ram.

15. In combination, loaf slicing means, loaf dividing means for dividing the sliced loaf into a plurality of divisions, a reciprocating ram for feeding loaves through said slicing means, moving cleats cooperating to take said sliced loaves away from said slicing means, and means for moving said cleats in such timed relation to said ram that the cleats first engage the sliced loaves at a time when the sliced loaves are not being advanced by the ram.

16. In combination, loaf slicing means, loaf feeding means to feed a loaf to and through the slicing means, loaf dividing means following the slicing means to divide the loaf into a plurality of divisions, and loaf conveying means for taking sliced loaves away from the slicing means and along the dividing means, said loaf conveyor comprising a moving belt and moving cleats overlying the belt and moving at a higher lineal speed than the belt.

17. In combination, loaf slicing means, loaf feeding means to feed a loaf to and through the slicing means, loaf dividing means following the slicing means to divide the loaf into a plurality of divisions, and loaf conveying means for taking sliced loaves away from the slicing means and along the dividing means, said loaf conveyor comprising a moving belt and moving cleats overlying the belt and passing beneath the dividing means.

18. In combination, a slicing mechanism comprising a plurality of laterally spaced knives adapted to slice a loaf or the like into a plurality of slices, loaf moving mechanism operating to move the loaf longitudinally through the slicing mechanism and longitudinally away from it, a laterally extending support, and a loaf divider movably mounted on said support for lateral adjustment into position opposite a selected one of said knives to enter a slice cut, the loaf moving mechanism moving the sliced loaf along the divider.

19. In combination, a slicing mechanism comprising a plurality of laterally spaced knives adapted to slice a loaf or the like into a plurality of slices, loaf moving mechanism operating to move the loaf longitudinally through the slicing mechanism and longitudinally away from it, a laterally extending support, and an expanding loaf divider slidably mounted on said support for lateral adjustment into position opposite a selected one of said knives to enter a slice cut, the loaf moving mechanism moving the sliced loaf along the divider to increase the separation distance between loaf divisions.

20. In combination, a slicing mechanism comprising a plurality of laterally spaced knives adapted to slice a loaf or the like into a plurality of slices, loaf moving mechanism operating to move the loaf through and away from the slicing mechanism, and a loaf divider to separate the sliced loaf at a slice cut into loaf sections; said divider comprising an entering sheet portion having parallel sides and so spaced from the knives as to enter a slice cut before the loaf fully passes the knives, the sheet portion extending away from the knives at least sufficiently that the loaf is fully clear of the knives before leaving said entering portion, a thickened portion with parallel sides for maintaining a gap between the loaf sections, and a tapered portion connecting the sheet portion and thickened portion to develop a gap between loaf sections.

21. In combination, a slicing mechanism comprising a plurality of laterally spaced knives adapted to slice a loaf or the like into a plurality of slices, loaf moving mechanism operating to move the loaf through and away from the slicing mechanism, and a loaf divider to separate the sliced loaf at a slice cut; said divider comprising an entering sheet portion and a thickened expanding portion, said entering portion being so spaced from the knives as to enter a slice cut before the loaf fully passes the knives and extending away from the knives at least sufficiently that the loaf is fully clear of the knives before reaching said expanding portion.

22. In combination, a slicing mechanism comprising a plurality of laterally spaced knives adapted to slice a loaf or the like into a plurality of slices, loaf moving mechanism operating to move the loaf through and away from the slicing mechanism, and a loaf divider to separate the sliced loaf at a slice cut; said divider comprising an entering sheet portion and a thickened expanding portion, said entering portion being so spaced from the knives as to enter a slice cut before the loaf fully passes the knives and extending away from the knives at least sufficiently that the loaf is fully clear of the knives before reaching said expanding portion; and a side rail laterally spaced from and parallel to said divider to cooperate with the divider to hold together as a unit a group of slices as the sliced loaf is moved along the divider away from the slicer.

23. In combination, a slicing mechanism comprising a plurality of laterally spaced knives adapted to slice a loaf or the like into a plurality of slices, loaf moving mechanism operating to move the loaf through and away from the slicing mechanism, an adjustable loaf divider to separate the loaf at a slice cut, and a pair of side rails spaced laterally one on each side of and parallel to the divider; said divider comprising an entering sheet portion entering a slice cut before the loaf fully passes the knives and extending away from the knives for at least a loaf width; and the divider being adjustable between the side rails to be moved into registry with selected knives intermediate said side rails.

24. In combination, a slicing mechanism comprising a plurality of laterally spaced knives adapted to slice a loaf or the like into a plurality of slices, a loaf moving mechanism operating to move the loaf through and away from the slicing mechanism, means to spread apart sections of the sliced loaf, said spreading means being spaced from the knives by a distance at least as great as a loaf width, and a loaf dividing plate entering the loaf at a slice cut to divide the loaf into sections and extending from a point adjacent one of the knives towards the spreading means.

25. In combination, a slicing mechanism comprising a plurality of laterally spaced knives adapted to slice a loaf or the like into a plurality of slices, a pair of side rails substantially alined with the outside knives and spaced, one each, from the outside knives, a loaf divider between the rails and alined with an intermediate knife, said rails and divider defining channels of proper size to take loaf sections and hold the slices thereof together as a unit, and loaf moving means for moving the loaves through the channels, said channels diverging to develop a gap between the loaf sections while maintaining the slices together in the sections.

26. In combination, a slicing mechanism comprising a plurality of laterally spaced knives adapted to slice a loaf or the like into a plurality of slices, a pair of side rails substantially alined with the outside knives and spaced, one each, from the outside knives, a loaf divider between the rails and alined with an intermediate knife, said rails and divider defining channels of proper size to take loaf sections and hold the slices thereof together as a unit, and loaf moving means for moving the loaves to and through the knives and through the channels, said channels diverging to develop a gap between the loaf sections while maintaining the slices together in the sections.

27. In combination, a slicing mechanism comprising a plurality of spaced knives adapted to slice a loaf or the like into a plurality of slices, loaf moving means for conveying the loaf through and away from the slicing means, a divider entering a slice cut to divide the loaf into sections at a slice cut, and stationary end guides cooperating with the divider to hold together as a unit the slices in each section.

28. In combination, a slicing mechanism comprising a plurality of spaced knives adapted to slice a loaf or the like into a plurality of slices, loaf moving mechanism operating to move the loaf through and away from the slicing means, loaf supporting means ahead and behind the knives to support the loaf and each slice of the sliced loaf against gravity, an adjustable loaf divider entering the loaf at a selected slice cut to divide the loaf into sections, and end guides for directing the movement of the loaf and cooperating with the divider to hold together as a unit the slices in each section.

29. In combination, slicing mechanism comprising a plurality of vertically moving, laterally spaced knives adapted to cut a loaf of bread into a plurality of slices; a foraminous plate through which said knives pass; loaf moving means to move a loaf across said plate and past the knives; a discharge conveyor to remove the sliced loaf; a loaf divider having an entering sheet portion adjacent one of said knives to enter the loaf at a slice cut while held open by the knife to divide the loaf into sections, said sheet portion extending away from the knives for at least a loaf width; and slice confining means cooperating with the divider to hold together the slices in the loaf sections while being moved by the conveyor.

WILLIAM WALTER HARTMAN.